United States Patent [19]
Peterson

[11] 3,877,906
[45] Apr. 15, 1975

[54] FILTRATION APPARATUS
[76] Inventor: Carl R. Peterson, 14 Elm St., Boxford, Mass. 01921
[22] Filed: Apr. 6, 1972
[21] Appl. No.: 241,747

[52] U.S. Cl. ............... 55/404; 55/407; 210/213; 210/217; 210/354; 210/380; 233/28
[51] Int. Cl. ............................. B01d 46/02
[58] Field of Search ............ 55/400, 404, 405, 407, 55/218; 210/210, 211, 212, 213, 216, 217, 354, 360, 380; 233/27, 28, 46, 47

[56] References Cited
UNITED STATES PATENTS
| | | | |
|---|---|---|---|
| 2,587,206 | 2/1952 | Pattinson | 233/46 X |
| 2,727,629 | 12/1955 | Hertrich | 210/66 X |
| 3,385,573 | 5/1968 | Gilman | 55/404 X |
| 3,447,290 | 6/1969 | Flory | 55/404 X |
| 3,655,058 | 4/1972 | Novak | 210/380 X |

FOREIGN PATENTS OR APPLICATIONS
1,221,616   6/1960   France ............................ 210/360 A Primary Examiner—Frank W. Lutter
Assistant Examiner—William Cuchlinski, Jr.
Attorney, Agent, or Firm—Dike, Bronstein, Roberts, Cushman & Pfund

[57] ABSTRACT

An apparatus for filtering particulate matter which includes trap means for permitting higher density particulate matter to leave the space between a shell and filter while preventing lower density gas from escaping from the same space.

1 Claim, 13 Drawing Figures

FIG. 1

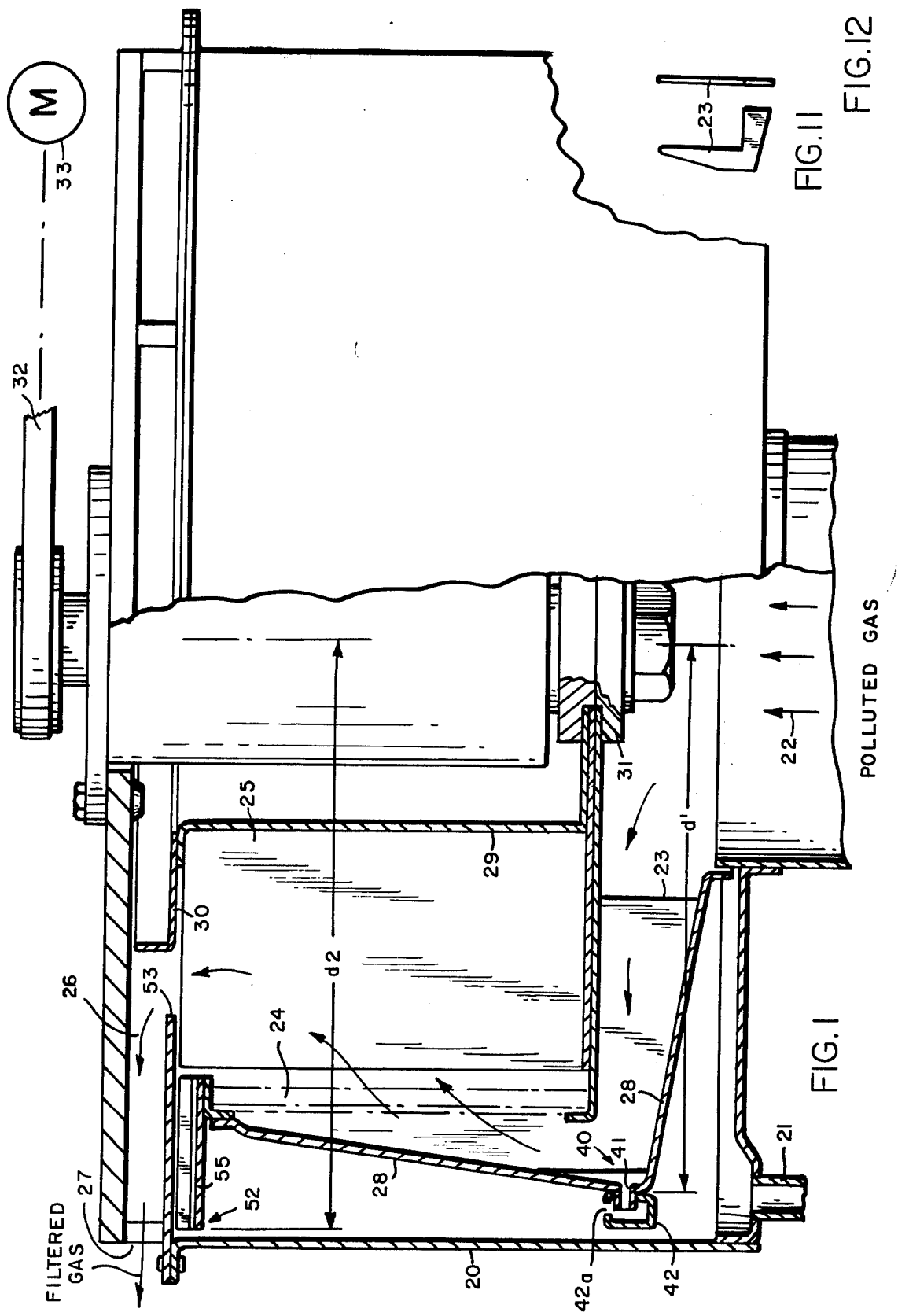

FILTRATION APPARATUS

This invention is an improvement over the apparatus of U.S. Pat. No. 3,655,058 issued Apr. 11, 1972, and is incorporated herein to show the status of the prior art.

BACKGROUND OF THE INVENTION

In particular the present invention provides means for permitting the apparatus of the aforementioned patent to better filter a fluid medium such as gas most commonly air which has been polluted with liquid or solid particulates of very small particulate size (i.e., from 2.0 microns down to approximately 0.2 micron size).

Removal of very small sized foreign matter from air or gas is traditionally accomplished by electrostatic devices or by bag filters. Consideration of the bag filter and its deficiencies will clarify the intent of the present inventions. In order that it be effective with small particles the filter medium must be dense, with fibre size small enough and fibre distribution fine enough to stop the pollutant in question. It has, therefore, inevitably a rather high pressure drop. In addition, as the particulate is filtered out from the air or gas, it collects on the surface of the filter medium, blocks the pores in the medium, and obstructs the flow of air or gas. The pressure drop, therefore, continues to increase as the particulate is filtered out. In most bag filters the medium is either periodically discarded for a clean piece, or intermittently cleaned by one process or another.

In the aforementioned patent application there is disclosed in an improved filtration apparatus, a rotating filter cage in which the centrifugal force field generated by its own rotation keeps the filter medium clean, and unlike a bag filter it does not become loaded with pollutant.

In the aforementioned patent application air enters the inlet of the apparatus, is given a pressure rise and a high centrifugal component, is then forced through the filter cage carrying a filter medium, then subsequently enters a turbine or expander and is guided out of the apparatus by a diffuser through an exit port.

In the preferred construction a conical rotating shell is provided which rotates with the filter cage so that there is little or no gas leakage from it.

Although the above apparatus is perfectly adequate for its intended purposes, the improvements disclosed herein have been made thereto to permit even more efficient filtering to be accomplished particularly where sub-micron particles are to be filtered.

It should also be understood that the improvements disclosed herein will also find use in other situations which would be apparent to those skilled in the art.

SUMMARY OF THE DISCLOSURE

The disclosure herein describes a filtration apparatus of the type which preferably includes a rotatable filter cage and;

1. means to permit liquid particulate to escape from the inside of a rotating shell positioned adjacent to said cage without allowing uncleaned air or gas to also escape;
2. an aerodynamic seal, one embodiment of which comprises a rotating annular plate on which are mounted multiple fins or vanes to prevent the bypassing of particulate matter around the filtering portion of the device;
3. means for providing a fluid spray for backwashing or causing agglomeration or collection of particles depending upon the density of the particles; and
4. means for cleansing high pressure pollutant laden gas (e.g., air) while providing means for rotating the filter cage.

BRIEF DESCRIPTION OF THE DRAWINGS

FIG. 1 is an illustration of one embodiment of the apparatus according to the disclosure, only one side thereof being shown because it is symmetrical;

FIGS. 11 and 12 are side and front views of the vanes shown in FIGS. 1, 6 and 7; and FIG. 13 is a top view of a portion of the nozzle assembly 72 with slots 72a.

DETAILED DESCRIPTION OF THE DISCLOSURE

Figures 2, 3, 4, 5, 6:
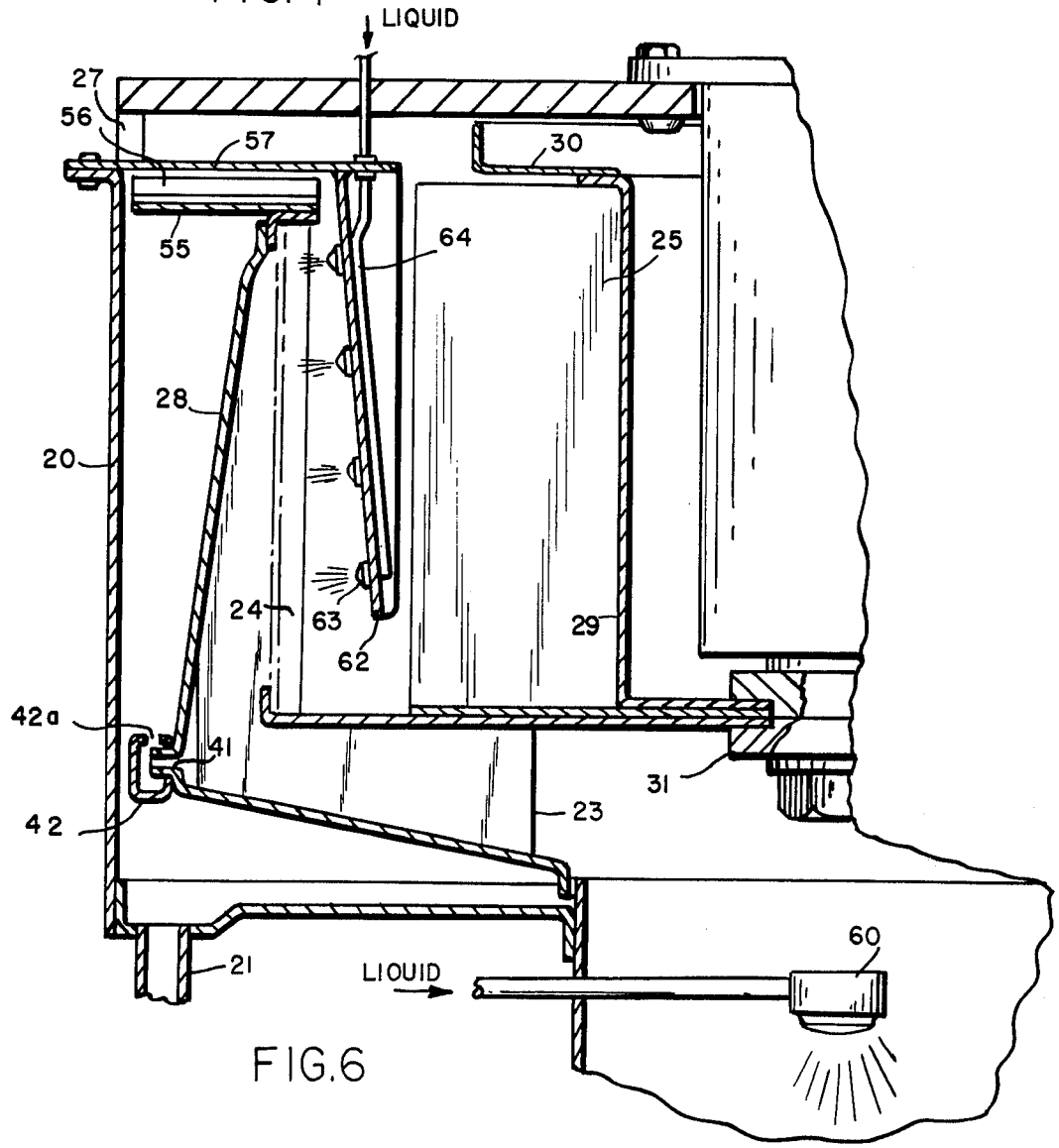
FIG. 2 is an enlarged sectional view of the portion of the apparatus according to the invention for trapping pollutants.
FIG. 3 is a view taken looking along lines 3—3 to indicate the cup like construction of a portion of the trapping means shown in FIG. 2.
FIG. 4 is a view showing the aerodynamic seal assembly disclosed in FIG. 1.
FIG. 5 is a view illustrating a modification of trapping means suitable for use in place of the trapping means shown in FIGS. 1-4.
FIG. 6 illustrates in another sectional view an embodiment of the invention containing means to scrub (back-wash) agglomerated particles of material accumulated in the apparatus.

Reference should now be had to FIG. 1 which discloses at 20 a housing or casing having one or more ports 21 (only one of which is shown) for disposing of collected particulate matter such as oil.

A gas such as air laden with oil enters the housing 20 as shown by the arrows 22, passes through a compressor having compressor vanes 23 (shown in FIGS. 11 and 12) and thence inpinges upon filter cage 24. The compressor vanes imparts a pressure rise as well as high centrifugal components to the polluted air. The filter cage 24 preferably comprises a frame supporting a layer of filter material such as polyurethane foam, asbestos fiber or the like and which preferably has positioned along its outer surface a metallic screen such as disclosed in the aforementioned U.S. Pat. application.

Thereafter, the air after passing through the filter cage 24 moves into an expander or turbine having expander or turbine vanes 25, is passed through a stationary radial diffuser 26 and exits through port 27.

The air as it is cleaned follows the path of the arrows while the pollutant, e.g., oil, is stopped by the filter cage 24 and spins outwardly against a rotating shell shown at 28.

The rotating shell 28 is essentially conical shaped and contains the rotating parts 23, 24, 25 as well as rotating structural and deflecting member 29 which in turn supports deflecting member 30 for rotation therewith.

The rotating parts of the device are supported by a member 31 as shown which rotates by the use of a pulley arrangement 32 driven by a motor 33.

As one feature of the present disclosure there is included means to permit liquid particulate to escape from the inside of the rotating shell 28 into the inside of the casing 20 so that it can be collected through ports 21 without allowing uncleaned gas (air) to also escape.

In order to accomplish the above one or more ports 40 comprising a tube 41 are provided (e.g., welded or soldered) into the rotating shell 28 preferably at or near its outmost diameter.

The tube as shown terminates in a cup 42 (also see FIGS. 2 & 3) with the cup 42 having a hole 42a at the top thereof. When the unit is not in operation, the cup contains a quantity of the liquid being filtered (e.g., oil, etc.) within it. This is indicated in the dotted line 44 which is meant to represent the liquid level in the stationary cup. When the apparatus is rotating (that is shell 28 and cup 42) the centrifugal force field causes the liquid level line to assume such position 45 as shown in FIG. 2 and covers tube 41 outlet.

As more liquid aerosol is separated from the gas and is thrown onto the inner surface of the rotating shell 28, it escapes into the cup 42 through the tube 41. The liquid level will finally reach the edge of the port hole exit port 42*a*, and be thrown out into the stationary casing 20. Since the air or gas within the rotating shell 28, has a significantly lower density than does the liquid particulate, it cannot escape because the oil wall blocks its passage.

In the preferred embodiment it is preferred for reasons of balance that at least two of such collection cups 42 be used.

It should be understood that instead of one or more of collection cups 42 mounted on the shell 28, an annular trough 50, with cross-sections in the shape of the cup 42 as shown in FIG. 10 and having an opening at the top thereof shown at 50*a* may be used. The trough is supported by the outside of the shell as shown in the top view thereof in FIG. 10. One or preferably more tubes 41 are provided as shown in FIG. 10 which are constructed as in FIG. 1.

As yet another alternative, construction of a pigtail arrangement of the tube 41 may be provided as shown in FIG. 5.

For a device such as shown in the aforementioned patent application as well as in the embodiments of FIGS. 1–12, it is important that no air or gas be permitted to get from the upstream to the downstream side of the filter without having passed through the filter.

Two possible sources of such leakage exist. First, unfiltered gss could enter at the upstream seal 51 (see FIG. 1) and pass through the downstream spaces 52 and 53. Second, any leakage from the rotating shell 28, into the inside of the casing 20 could find its way through the seal spaces 52 and 53 if the pressures in the system permitted it.

In order to substantially prevent leakage from occuring as mentioned above, there is provided an aerodynamic seal (assembly) which in its preferred construction as shown in FIGS. 1, 6 and 7 and in detail in FIG. 4 comprises an annular rotating plate 55 supported by a flange 54 coupled to the shell 28. Mounted on the plate 55 are a plurality of fins or vanes 56 (e.g., by riveting).

The entire assembly of 55 and 56 rotates as an integral part of the rotating members e.g., member 28 and its function is to assure that a pressure rise is maintained from the inner diameter of the aerodynamic seal to its outer diameter.

Thus the aerodynamic seal will assure that no flow will pass radially inward through gaps 52 and 53 as long as the outer diameter ($d^2$) of the rotating aerodynamic seal is greater than the outermost diameter ($d^1$) of the rotating shell 28. As will be understood by those skilled in the art the difference between the outermost diameter ($d^2$) of the aerodynamic seal and that of the rotating shell 28 ($d^1$), must increase as the pressure drop across the filter 24 increases and therefore the diameters ($d^1$) and ($d^2$) (see FIG. 1) are set in accordance with the filter medium to be used. In addition, the clearance between the fins 56 and the stationary port member 57 should be made as small as possible to further prevent leakage.

Accordingly, as long as the outer diameter ($d^2$) of the aerodynamic seal assembly exceeds the outermost diameter ($d^1$) of the rotating shell 28 to provide the needed pressure rise, all leakage flow will be forced out through clearance 51 and thus be forced back into the main fluid flow for filtering.

The present disclosure also sets forth additional improvements for the filtering of solid particulates. In the following disclosure the same numbers are used wherever applicable to represent the structures described in FIGS. 1–5.

Solid particulates vary in density. Fly ash, for example, is less dense than oil or water; coal dust hsa a greater density. Solid particulates vary also in their tendency to agglomerate when compacted.

Reference should now be had to FIG. 6 showing means to aid in the filtering of such solid particulates. A comparatively dense material which agglomerates readily will be thrown from the filter cage in a manner very similar to a liquid particulate. A simple spray system 60 at the inlet of the device is sufficient for adequate collection (see FIG. 6). A normal water spray nozzle will produce liquid particles in the order of 40 or more microns in size.

These particles have sufficient mass such that they will never normally reach the filter cage 24. They will immediately be thrown against the inside of the shell 28 by the centrifugal force field generated by the rotation of the device. The water adjacent to the inside of shell 28 however, will wash out the agglomerated solid particulate discharged from the filter 24 and it will pass on through the system as a sludge, or slurry, being collected through port 21 in a fashion identical to that described above. Thus by the provision of means providing water or other liquid of sufficient particle size, washing out of the agglomerate is achieved.

At the other end of the scale of solid particulates is the material of low density which does not readily agglomerate. For materials of this type, back-washing is provided again as shown in FIG. 6.

A continuous annular shell 62 is attached (e.g., by weld or rivet) to the stationary member 57. The annular shell 62 is stationary and non-rotating. On its upper surface it contains a number of spray nozzles 63 which are fed by an external water source through tubes 64. A continuous, or intermittent, spray of water (or other liquid) through the nozzles will wash from the filter medium surface the small size particles which are there entrapped. The cleaned air, or gas, will pass through the filter 24, then into the turbine vanes 25 and out the turbine discharge 75 as before described.

Note that the back-wahsing function described could be performed by individual tubes (like tube 24) without the added complexity of the completely annular shell 62. Were this done, however, the resulting configuration would generate a high noise level (it would, in fact, be a rudimentary siren). The annular structure enclosing the liquid injection tube 64 is therefore considered an important feature of the invention.

It should be noted that both washing features are merely shown for convenience in FIG. 6 since in the normal situation only one or the other of the washing means (i.e., nozzle 60 or 63) will be used at the same time although this invention does not preclude simultaneous use thereof.

Figure 7:
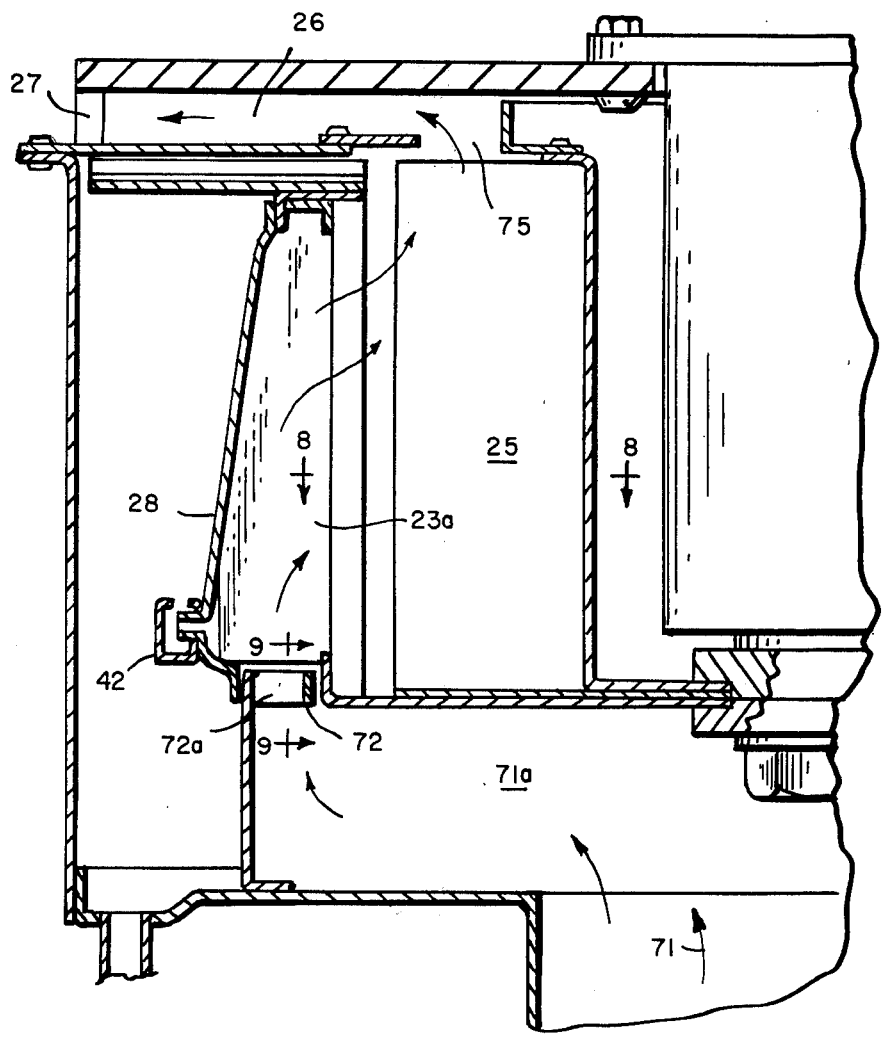
FIG. 7 illustrates in another view certain means for developing its own propulsion as it cleans a gas entering at a high pressure.

FIG. 7 shows yet another embodiment of the principles contained in the basic dynamic air filtration device. Again the same numbers are used to designate like parts. It is recognizably much the same as the devices shown in FIGS. 1-6.

Figure 9:
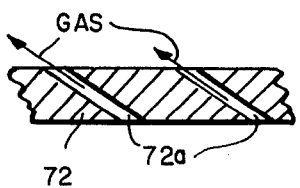
FIG. 9 is a view taken along lines 9—9 of FIG. 8.
Figure 13:
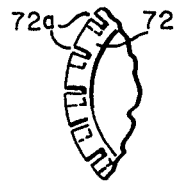
Figure 10:
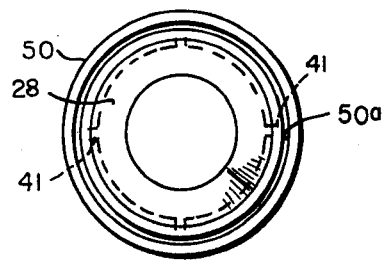
FIG. 10 is a view illustrating in yet a further embodiment a suitable trapping means for capturing pollutants.

The device shown in FIG. 7 presupposes, however, that the pollutant laden air or gas entering at 71 is at a high pressure. From the inlet it enters the stationary annular chamber 71a and from thence into the nozzles 72. A cross-section of the nozzles 72 is shown in FIG. 9 and a top view in FIG. 13. In passing through the open nozzle passages 72a the gas (e.g., air) is turned sharply and has imparted to it a high component of tangential velocity. The nozzle shown performs the same function as the nozzle of an axial gas or steam turbine. It converts the pressure energy existing upstream of the nozzle (within stationary chamber 71a into kinetic energy at the nozzle exit.

From this point on the device looks and operates nearly identically to that described in the embodiment discussed in FIGS. 1-6. The particle laden fluid (air or gas) passes into the rotating volume bounded on the outside by the rotating shell 28. It passes down through the filter 24 and the particles, solid or liquid are removed. The now cleaned gas then passes into the passages between the vanes 24. In addition, supporting vanes 23a are preferably provided for supporting the shell 28 and to aid in propulsion of the rotating elements.

Figure 8:
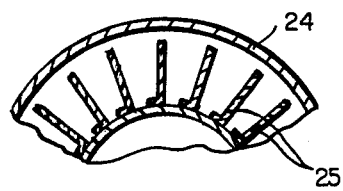
FIG. 8 is a sectional view taken along lines 8—8 of FIG. 7.

This is shown somewhat more clearly in FIG. 8. The vanes 25 are turbine vanes, and perform identically the same function as the radial vanes of a radial flow turbine. The cleaned air or gas exits from the rotating portion of the system and flows radially outward through the stationary passage 26. This passage is once again, a radial diffuser which not only conducts the cleaned air out of the system, but also serves to convert any kinetic energy which remains at port 75 back into pressure energy. The gas leaves the system at the final port exit 27.

The pollutant which was originally contained in the gas is, as before, stopped at the face of the rotating filter 24. If it is a liquid pollutant, it will agglomerate into particles large enough so that it becomes subject to the centrifugal force field generated by the rotation of the filter device. The liquid is thrown to the outermost radius of the conical shell 28 and thence out of the rotating system as previously disclosed.

If the gas being filtered contains solid rather than liquid particulate, one form or another of the washing or scrubbing procedures already described may be used. The solid particulate is removed from the system suspended in the liquid used for scrubbing, and the previous description applies in its entirety.

In order to assure effective self-cleaning of the filter medium, it is necessary that the centrifugal force field generated by its rotation be high. The free running speed of the turbine system in FIG. 7 will be high if the available pressue of the polluted gas at the inlet 71 is high. If this is so, the device will, as shown, operate without an external power source, and its rotational speed can be controlled by the mean radius of port 75 which is the entry to the diffuser 26.

If the pressure energy of the gas at 71 is sufficient to overcome the pressure drop through the filter, and other losses in the system, but not sufficient to provide a high level of kinetic energy downstream of nozzle 72, the steady state speed of the device may be too low for effective filter medium self-cleaning. In this event, a subsidiary energy source can be used, that is a drive motor and pulley system such as shown in FIG. 2 may be used.

A system such as that described has many possible application. One, of potentially great significance, arises in connection with the diesel engine. A large part of the visible smoke from a diesel exhaust is solid particulate. The particulate has a size of about one micron. A device such as that illustrated in FIG. 7 would collect the particulate and would be self-cleaning. It would constitute a part of the engine muffler system.

I claim:

1. Apparatus for removing particulate matter from a fluid medium entering the apparatus at high pressure which comprises a housing, a filter means positioned in the housing for rotation therein, a shell means positioned between said housing and said filter means and defining a space for the reception of the fluid medium containing particulate matter, said shell means supporting vanes within said space for rotation therewith, and said shell means constructed to rotate with said filter means, means for permitting the passage of fluid from said housing after filtering, drive means comprising stationary annular nozzle means supported by the housing and positioned to cause rotation of said filter means, shell means and vanes upon the passage of fluid under high pressure therethrough as the fluid passes into the space for filtering, and means for collecting the particulate matter after filtering.

* * * * *